United States Patent [19]

Gilmor

[11] Patent Number: 4,483,305
[45] Date of Patent: Nov. 20, 1984

[54] FUEL VAPORIZATION DEVICE

[76] Inventor: James E. Gilmor, 5524 Tucson St., Denver, Colo. 80239

[21] Appl. No.: 423,437

[22] Filed: Sep. 24, 1982

Related U.S. Application Data

[63] Continuation-in-part of Ser. No. 404,518, Aug. 2, 1982.

[51] Int. Cl.$^3$ ............................................. F02M 31/00
[52] U.S. Cl. ...................................... 123/557; 418/63
[58] Field of Search ............... 123/557, 445; 418/63, 418/60, 83

[56] References Cited

U.S. PATENT DOCUMENTS

| | | | |
|---|---|---|---|
| 2,635,553 | 4/1953 | Gordinier | 418/60 |
| 2,997,035 | 8/1961 | Ball | 123/445 |
| 4,003,356 | 1/1977 | Naylor | 123/557 |
| 4,005,951 | 2/1977 | Swinkels | 418/63 |
| 4,151,821 | 5/1979 | Wichman | 123/557 |

FOREIGN PATENT DOCUMENTS 146294 11/1980 Japan ...................................... 418/63

OTHER PUBLICATIONS

Motomu Kawamura & Itsuo Chu, "A New Rolling-Piston Compressor for Automotive Air Conditioners, pp. 11-14, Dec. 1981, Mitsubishi Electric Advance.

*Primary Examiner*—Ronald H. Lazarus
*Attorney, Agent, or Firm*—Fields, Lewis, Pittenger & Rost

[57] ABSTRACT

A fuel vaporization device is provided wherein atomized liquid fuel is injected in timed sequence directly into the vacuum chambers of a rolling piston vacuum pump. Optionally, minute amounts of air are bled into the vacuum chamber as the liquid fuel droplets are injected resulting in substantially complete and immediate vaporization of the fuel which is fed as gaseous fuel from the vacuum pump to the intake manifold of an internal combustion engine. A water jacket surrounds the pump for circulating heated liquid coolant from the engine in heat exchange relationship with the fuel in the vacuum pump.

8 Claims, 9 Drawing Figures

FUEL VAPORIZATION DEVICE

This application is a continuation-in-part of my co-pending U.S. application Ser. No. 404,518, for "Fuel Vaporization Device for Internal Combustion Engine", filed Aug. 2, 1982.

TECHNICAL FIELD

This invention relates to a device for converting liquid fuel to gaseous fuel prior to introduction into an intake manifold of an internal combustion engine. More particularly, the invention relates to injection of liquid fuel droplets into a heated vacuum chamber of a vacuum pump wherein the fuel droplets are converted to gaseous fuel which is conveyed at a substantially constant temperature to the manifold. Optionally, minute amounts of air can be introduced into the vacuum pump through a bleed valve. A heat exchanger is utilized with the vacuum pump wherein cooling liquid from the engine block of the internal combustion engine is brought into heat exchange relationship with the gaseous fuel to maintain the gaseous fuel at a substantially constant temperature.

BACKGROUND ART

It is well understood that the greater the vaporization or gasification of liquid fuel that can be accomplished the greater the surface area of the fuel which is subject to oxidation and therefore the higher the rate of combustion. In other words, the greater the percentage of the fuel that can be burned, the more efficient the operation of the engine. Attempts to completely gasify liquid hydrocarbon fuel go back many years. However, all of these attempts have had significant shortcomings. In some instances, the devices did not completely vaporize the fuel and therefore the expected increase in efficiency did not materialize. In other cases, the devices were of such a complex nature as to negate any real benefit from them or require such high power inputs themselves that even though a greater fuel efficiency was realized, the increased power needs negated this benefit.

It is elementary that in order to maximize the combustion of fuels it is necessary to bring as much of that fuel as possible into close proximity with oxygen. The only portion of a droplet of fuel which can be oxidized is the surface area. Therefore, the smaller the droplets the greater the total percentage of fuel which can be burned or oxidized. Thus, to increase oxidation it is necessary to increase vaporization. All present commercially successful carburetion systems attempt to vaporize liquid fuel prior to introduction into the manifold of the engine. While this is possible to some extent, the variation in fuel droplet size at the intakes to the carburetor can vary substantially and in fact a relatively low percentage of the total fuel is actually oxidized and burned when supplied through a standard carburetor.

The ultimate carburetion system would be one that feeds fuel to the manifold in a pre-vaporized or gaseous form and particularly one in which all liquid fuel is converted to a gaseous fuel prior to entering the manifold and the cylinders of the engine. The known prior art devices have fallen short in several respects in accomplishing this end.

For instance, one of the most noted prior art devices which was developed by Charles Nelson Pogue in the 1930's was a carburetor for the vaporization of gasoline which has been widely advertised as the two hundred mile per gallon carburetor. This device has never enjoyed wide commercial success because it is nearly as large and cumbersome as the engine it is meant to fuel and it requires an operating temperature which approaches the flash point of fuel, such as gasoline. Therefore, the safety of the passengers in the vehicle in which the carburetor is used may be in jeopardy as well as those who are near the vehicle. In other words, the potential for an explosion is quite great.

A device for vaporizing fuel, such as diesel fuel is disclosed in U.S. Pat. No. 1,806,581 to Bethenod for "Fuel Supply System For Internal Combustion Engines of Variable Load For Using Heavy Fuels." The diesel fuel is supplied through a conventional gasoline carburetor and air is drawn through an intake by means of a vacuum pump. This system is an open system, i.e., air in large quantities is continuously drawn in from the atmosphere by a first vacuum pump. A second vacuum pump is intended to pull a vacuum on the air-fuel mixture in a reservoir to vaporize the fuel whereupon it is fed into a manifold of an engine which is supplied with still an additional air intake. Heat exchange means are provided around the reservoir and again near the intake manifold to minimize fluctuations in fuel temperature. Because the system is open, large quantities of air are drawn through it making it very difficult to draw a sufficient vacuum to substantially vaporize any fuel which was not vaporized directly by the carburetor. In other words, for such a device to operate effectively it would be necessary to provide such a huge vacuum pump that the fuel savings, if any, would be negligible. Alternatively, with a smaller vacuum pump the fuel is not properly vaporized in an open system wherein atmospheric air is constantly being drawn into the system.

Another device for providing gaseous fuel to the carburetor of an internal combustion engine is shown in U.S. Pat. No. 3,630,698 to Joseph H. Baldwin for "Fuel System". In this device, gaseous vapors are drawn from a vacuum chamber by means of a manifold vacuum. The vacuum chamber contains a supply of liquid fuel which is replenished through a float valve. Two potential problems are associated with this type of device. First, the vacuum from the manifold may not be sufficient under certain load conditions to provide sufficient fuel to the engine. Second, by drawing the gaseous vapors off a body of liquid gasoline the lighter hydrocarbons are boiled off first, leaving a relatively heavy liquid hydrocarbon, frequently referred to as "strip oil". Therefore, in order to keep the system working properly, means must be provided to regularly withdraw the strip oil and replace it with fresh gasoline.

Another device for vaporizing gasoline is disclosed in U.S. Pat. No. 4,040,403 to Rose, et al. for "Air-Fuel Mixture Control System". In this device, fuel is supplied to a vaporizer wherein the level of the liquid fuel in the vaporizer is controlled by a float valve. Hot exhaust gases from the engine are boiled through the liquid gasoline causing a portion of it to be vaporized and carried to the engine. The device includes a complex amplifying system for adjusting the air-fuel mixture and a separator for taking out any fuel droplets from the fuel as it is vaporized in the vaporizer. With this device, the lighter hydrocarbons will be vaporized leaving behind the heavier hydrocarbons or strip oil.

U.S. Pat. No. 4,175,525 to Johnson for "Fuel Vaporizer System For Internal Combustion Engines" discloses a sealed vaporization system connected between a fuel supply line and the intake manifold of an internal combustion engine and operated in parallel with a carburetor. A float valve is provided in this device to control the flow of liquid fuel to a chamber wherein it is vaporized and fed to a carburetor. The lighter hydrocarbons will be boiled off of the liquid fuel before the heavier hydrocarbons leaving strip oil in the chamber.

Another difficulty with prior art devices utilized to vaporize fuel is that no adequate provision has been provided for lubricating the walls of the piston of the vacuum pump. Thus, in many attempts to make such a vaporization system, the piston would "freeze" to the side walls of the cylinder. Attempts have been made to interject oil into the fuel, but this oil then was injected into the engine with the fuel vapor mixture causing unburned hydrocarbons from the oil and resulting in residue which was damaging to the engine.

DISCLOSURE OF THE INVENTION

In accordance with this invention, a device for converting liquid hydrocarbon fuel supplied from a fuel tank to a substantially gaseous fuel which is furnished to the intake manifold of an internal combustion engine is provided. The device includes a vacuum pump having a vacuum chamber with at least one inlet and one outlet. A fuel injector is connected to the inlet for injecting atomized liquid fuel droplets into the vacuum chamber in timed sequence. Means are provided for drawing a vacuum in the vacuum chamber in timed sequence with the injection of liquid fuel droplets to immediately vaporize substantially all of the liquid fuel droplets to form a gaseous fuel and for increasing the pressure of the gaseous fuel for discharge through the outlet to the engine manifold.

More particularly, a fuel gasification device for converting liquid hydrocarbon fuel to gaseous fuel for burning in the cylinders of an internal combustion engine is provided. This device includes a cylindrical gasification chamber having a longitudinal axis and a peripheral side wall. A rolling piston is excentrically mounted on the axis in the chamber for rolling movement about the peripheral side wall of the chamber. A longitudinal slot is provided along one side of the chamber and a vane is mounted in the slot for reciprocal movement toward and away from the axis and having an edge in contact with the piston. Resilient means urge the edge of the vane against the piston. An inlet in the side wall is provided adjacent one side of the slot for introducing liquid fuel into the chamber and an outlet is provided in the side wall adjacent the other side of the slot for discharging gaseous fuel to the engine. Means for sequentially injecting charges of liquid fuel droplets into the chamber through the inlet for predetermined periods of time are provided, and means are also provided for rotating the piston within the chamber to alternately create a vacuum in the portion of the chamber which is in communication with the inlet to gasify a charge of liquid fuel droplets as it is introduced through the inlet and increase pressure of the gaseous fuel in the portion of the chamber which is in communication with the outlet for supplying it to the engine. Finally, control means is provided for activating the injecting means to cause a charge of liquid fuel to be injected into the chamber for a predetermined time period as the vacuum is being created.

Optionally, minute amounts of air may be admitted through a bleed valve into the gasification chamber along with the atomized liquid fuel. This can improve flow of the subsequently formed gaseous fuel throughout the system in some installations.

Conveniently, a heater, illustrated as being in the form of a heat exchanger, is provided which supplies heat from the liquid coolant of the engine in heat exchange relationship with the vacuum pump to maintain the vaporized fuel at a substantially constant temperature. This heat lowers the vapor point within the vacuum pump to enhance vaporization of the liquid fuel in the vacuum chamber of the pump.

Advantageously, the rolling piston vacuum pump of this invention is provided with a source of lubricating oil under pressure which is injected into a bearing at one end of the pump and passes through the bearing and by suitable passageways to the vanes of the pump. The oil moves along the surface of the vanes to the surface of the rolling pistons thereby applying a thin film of oil to the surface of the pistons. This oil serves the dual function of lubricating the piston walls and providing a seal between the piston and the piston walls with the respective vanes. Excess oil passes into the bearing at the opposite end of the pump by means of a suitable passageway provided for this purpose.

A fuel control unit is connected to the fuel injector for controlling the frequency and volume of liquid fuel injected into the vacuum chamber in response to functions of the internal combustion engine. One such fuel control unit has an adjustable frequency selector circuit for activating the fuel injector after a predetermined number of firings of the engine coil and a variable pulse-width selecting circuit to vary the length of time during which the fuel injector is actuated.

Thus, it can be seen that a simple device for enhancing vaporization of liquid hydrocarbon fuel for an internal combustion engine has been provided. This is accomplished by injecting droplets of liquid fuel by means of a fuel injector into a vacuum chamber, along with optional minute amounts of air. A substantial vacuum is drawn in the vacuum chamber so that the fuel droplets are vaporized and supplied in a gaseous state to the intake manifold of the engine at substantially constant temperature. This results in increased efficiency in the combustion of the fuel, thereby maximizing the fuel mileage obtained.

The term "fuel" as used herein is intended to include gasoline, propane, butane, alcohol and any other relatively volatile hydrocarbon used to run an internal combustion engine.

The term "internal combustion engine" is intended to include all reciprocal piston engines, turbine engines and rotary engines, etc.

Additional advantages of this invention will become apparent from the description which follows taken in conjunction with the accompanying drawings.

BEST MODE FOR CARRYING OUT THE INVENTION

Figure 1:
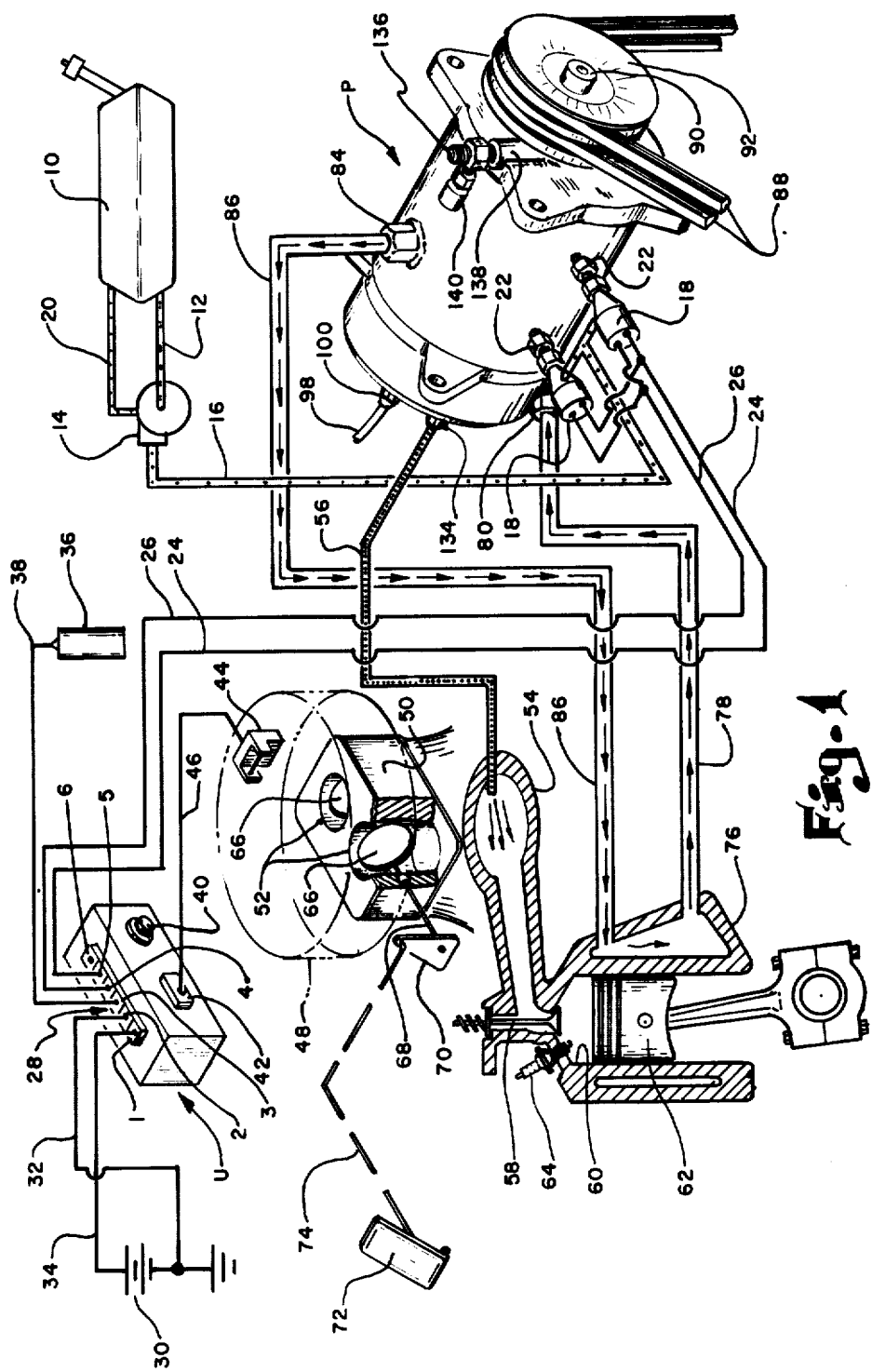
FIG. 1 is a diagrammatic illustration of a fuel vaporization device constructed in accordance with this invention.

In accordance with this invention, liquid fuel is pumped from a fuel tank 10 through a fuel line 12 by a fuel pump 14. The fuel pump may be a conventional electric fuel pump of the type used in the automotive industry. The pump supplies liquid fuel through a fuel line 16 to a pair of fuel injectors 18. Any excess fuel not required by the fuel injectors is returned to gas tank 10 through an overflow line 20 from fuel pump 14. The fuel injectors 18 are connected respectively to inlet ports 22 of vacuum pump P.

Each fuel injector is energized by power supplied from electronic fuel control unit U through lines 24 and 26 connected to a terminal strip 28 which has six contact points 1-6. Power is supplied to the electronic fuel control unit by means of a battery 30 connected to contact points 1 and 2, respectively, on terminal strip 28 through positive lead 32 and negative lead 34, as shown. The coil 36 associated with the internal combustion engine is connected to contact point 3 of terminal strip 28 as by a line 38. The signal from the coil is indicative of the speed of the engine and therefore provides a control for the frequency of energization of fuel injectors 18. The injectors are connected to terminal strip 28 through contact points 4 and 5. Contact point 6 is not used.

The control circuitry for the electronic fuel control unit U is substantially identical to that disclosed in my above-identified co-pending patent application and the disclosure of that circuitry is hereby incorporated by reference. The fuel control unit U includes a twelve position rotary switch 40 which can be adjusted to set the number of firings of the coil which will produce one fuel injection. A terminal 42 on the fuel control unit U is connected to an airflow sensor, such as hotwire anemometer 44, by means of a wire 46. The anemometer 44 is an integral part of an air-mass sensor 48. The air-mass sensor is mounted on a throttle body assembly 50 which includes air intake orifices 52 mounted to supply air to intake manifold 54. The arrangement of throttle body assembly 50 with respect to the intake manifold 54 is shown schematically in FIG. 1 and it will be apparent to one skilled in the art how to supply appropriate fluid conduits for supplying the air from air intake 52 to manifold 54. The air is mixed with gaseous fuel provided through fuel line 56 from vacuum pump P. The fuel-air mixture thus formed in manifold 54 is supplied through an intake valve 58 to cylinder 60 in which piston 62 reciprocates to burn the fuel upon ignition of spark plug 64, as is well known in the art. Although only one cylinder has been shown, it will be understood that the engine may have multiple cylinders.

The amount of air supplied to the engine is controlled by means of butterfly valves 66 mounted in intake orifices 52 for pivotal movement in response to rotation of rod 68 mounted on a control arm 70 connected to gas pedal 72 by means of a linkage 74. Thus, as gas pedal 72 is depressed to accelerate the car, butterfly valve 66 will open to draw in more air. The amount of air being drawn into manifold 54 is sensed by weight and a signal indicative of such weight is provided to fuel control unit U which in turn activates fuel injectors 18 in response to such signal.

Figure 2:
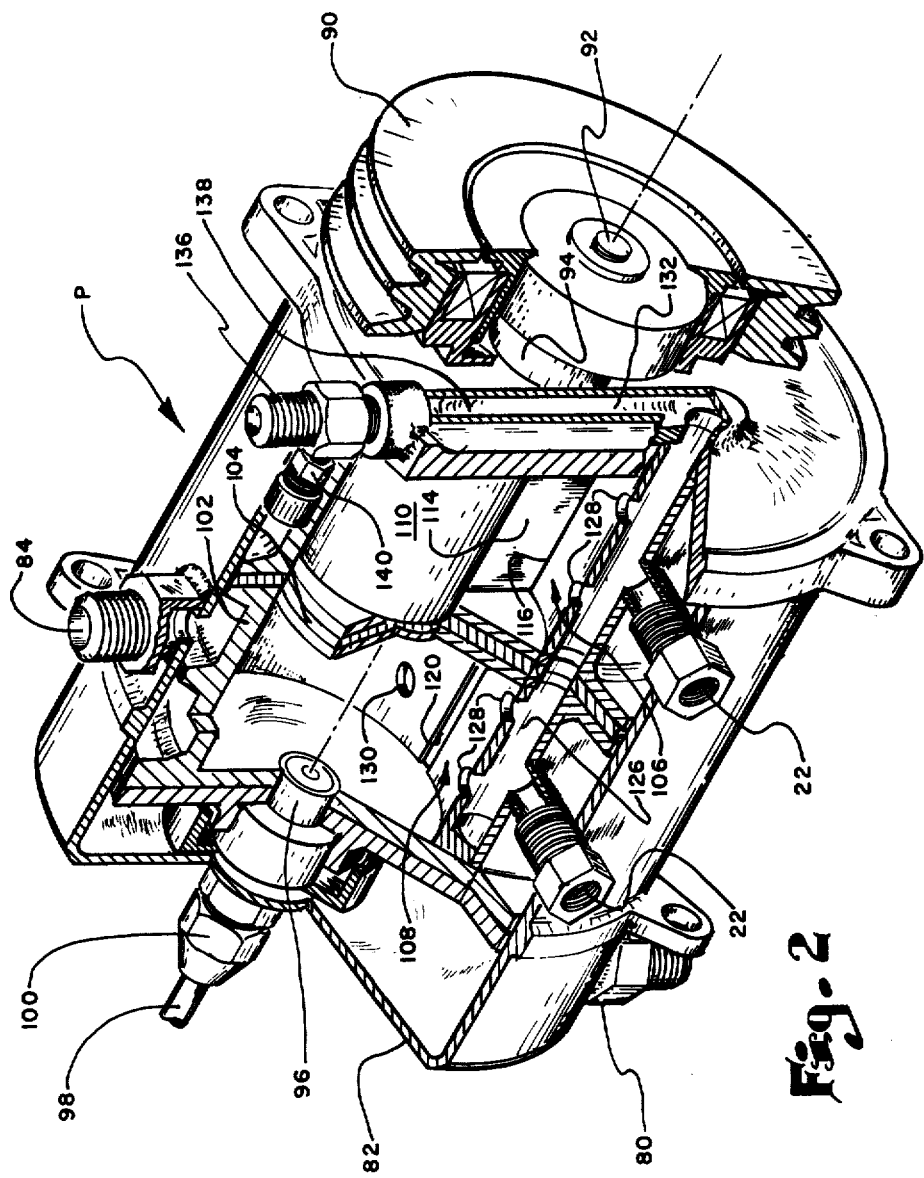
FIG. 2 is a perspective view of the vacuum pump of this invention broken away to show the details of the gasification chambers.
Figure 3:
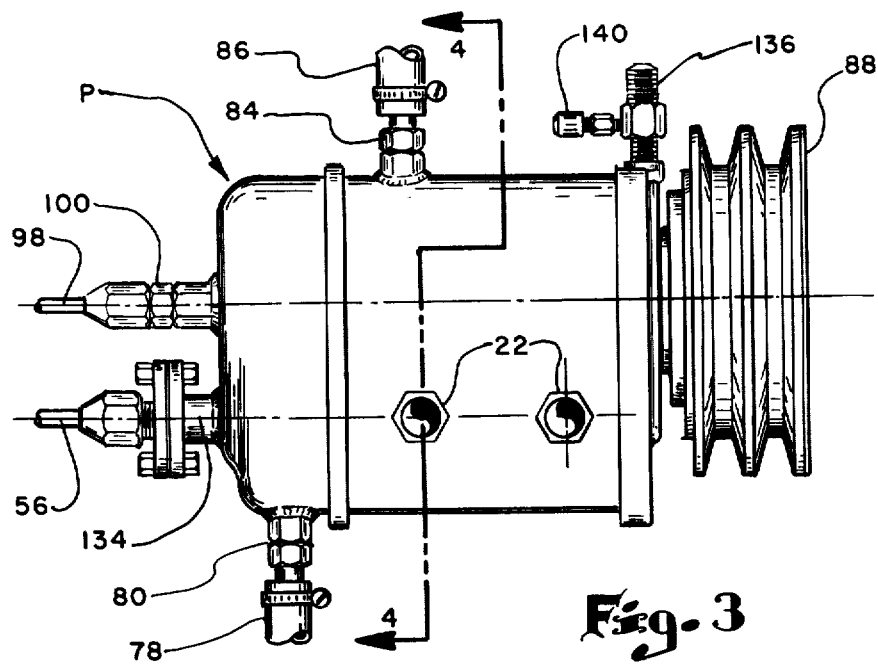
FIG. 3 is a side elevation of the vacuum pump of FIG. 2, but on a slightly reduced scale.

Conveniently, a heater, illustrated as being in the form of a heat exchange system, is provided for maintaining the gaseous fuel at substantially constant temperature within the vacuum pump P whereby cooling fluid from the motor block 76 is used as a heat transfer medium. The heated coolant is supplied by a supply tube 78 to an inlet 80 to the water jacket 82 of vacuum pump P, as best seen in FIGS. 2 and 3. After circulating through the water jacket, in a manner which is more fully described below, the coolant passes through an outlet 84 and a return tube 86 to motor block 76.

Figure 4:
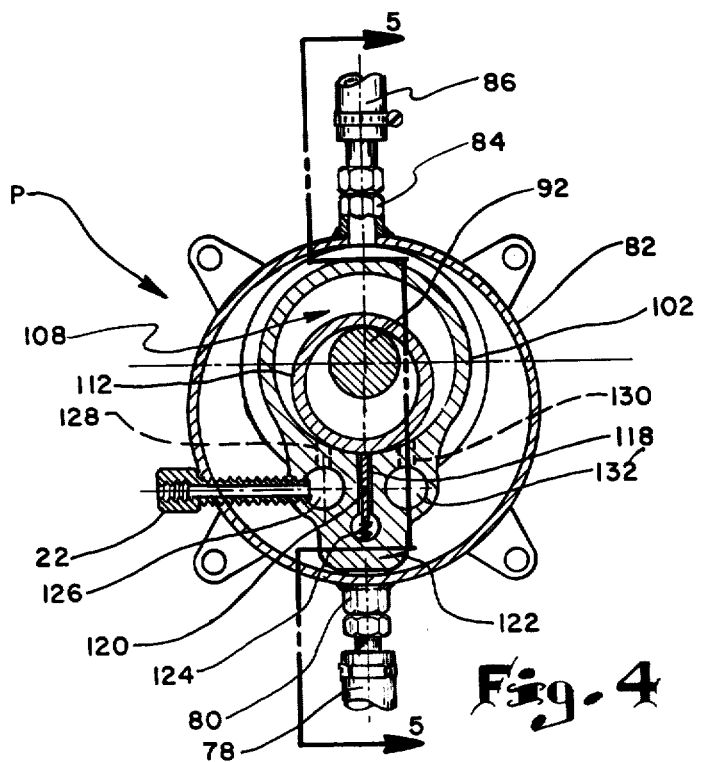
FIG. 4 is an offset vertical section, taken along line 4—4 of FIG. 3, showing further details of the gasification chamber and heat exchange jacket.
Figure 5:
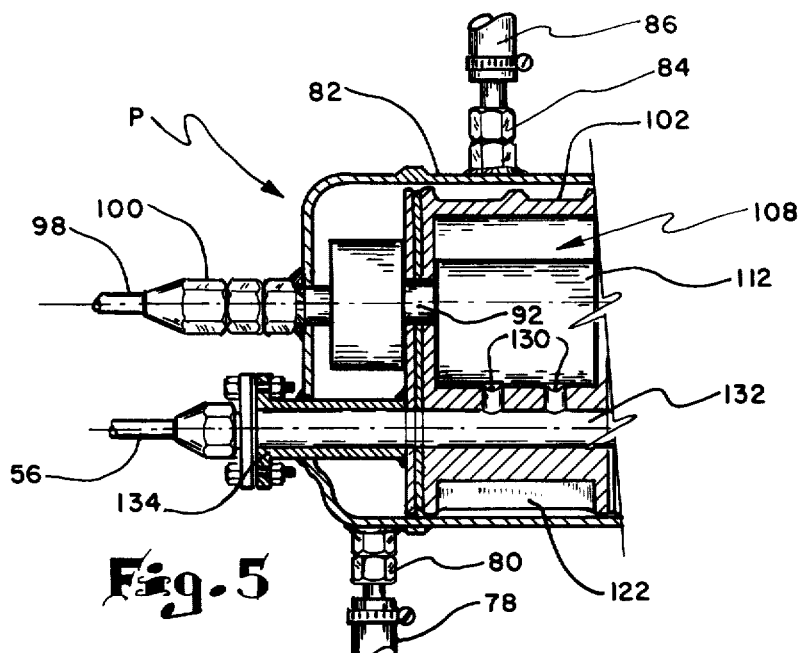
FIG. 5 is a fragmentary offset vertical section, taken along line 5—5 of FIG. 4, showing details of the exhaust port and heat exchange jacket.
Figure 6:
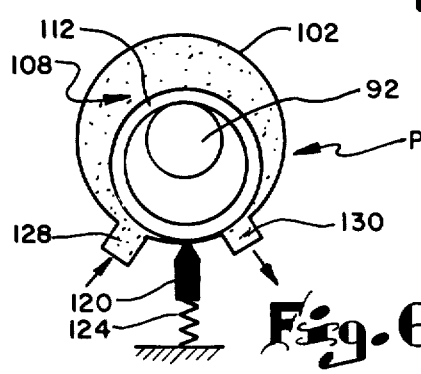
FIGS. 6-9 are diagrammatic illustrations of the sequential operation of a rolling piston vacuum pump as utilized in the gasification device as shown.
Figure 7:
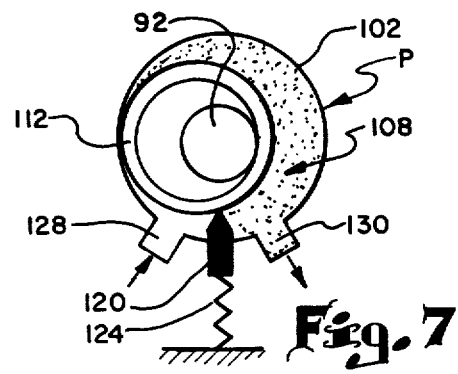
Figure 8:
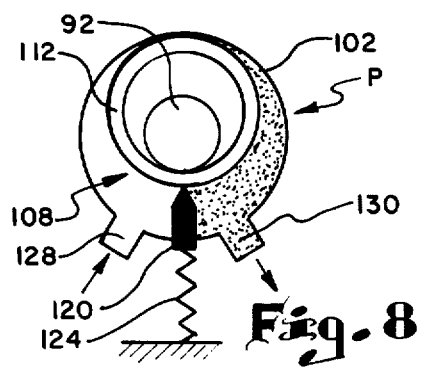
Figure 9:
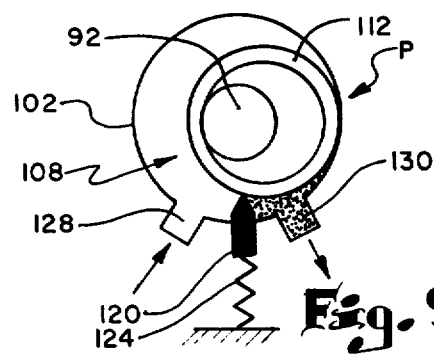

Looking now at the details of vacuum pump P, as best seen in FIGS. 2, 4 and 5, the pump is driven as by a pair of belts 88 from the engine which extend around a double pulley 90 attached to crank shaft 92. Conveniently, crank shaft 92 is supported in a pair of spaced bearings such as front bearing 94 and rear bearing 96. The bearings may be sealed bearings or may be lubricated as from an oil pressure line 98 which is connected to a fitting 100 at the rear end of crank shaft 92 and supplies oil to the bearings and to the surfaces of the rolling pistons, all as more fully described in my above-identified co-pending application. Mounted within water jacket 82 and spaced therefrom is cylinder 102 which is divided by wall 104 into a first or forward chamber 106 and a second or rear chamber 108. Conveniently, a first rolling piston 110 is excentrically mounted on crank shaft 92 for rotation about the peripheral wall of chamber 106, whereas the rear chamber 108 is provided with a rolling piston 112 also excentrically mounted on crank shaft 92. As will be apparent to one skilled in the art, these pistons are mounted 180° out of phase with each other so they are in opposite halves of their respective cycles to provide a smooth and continuously operating vacuum pump. A vane 114 is mounted for reciprocal movement through a slot 116, shown in FIG. 2. Similarly, vane 118, is mounted in slot 120 in the bottom of chamber 108. Conveniently, the slots 116 and 120 are located in cylinder base or support 122, best seen in FIG. 4. In each instance, the edge of the vane is urged against the wall of the respective pistons by a spring such as spring 124 which bears against the bottom of vane 120. This divides the chamber into a vacuum portion and a pressure portion, all as described more fully below. Fuel is sequentially injected by fuel injectors 18 in accordance with the control settings of fuel control unit U. The atomized fuel is injected into a longitudinal passageway 126 which is in fluid communication with chambers 106 and 108 through intake ports 128, as shown in FIG. 2. Compressed gaseous fuel will be discharged through discharge ports such as ports 130 into a longitudinal passageway 132, best seen in FIG. 5 and through outlet port 134 connected to fuel line 56, which is connected to engine intake manifold 54, as previously described.

The operation of vacuum pump P can best be understood by reference to FIGS. 6-9, which diagrammatically show one cycle of a piston in one of the chambers, such as rear chamber 108. The gaseous fuel is drawn into chamber 108 through intake ports 128 due to the vacuum or subatmospheric pressure created by the pump. The rolling piston 112, together with vane 120 which is urged against the surface of piston 112 by spring 124 divides cylinder 102 into two chambers, namely a vacuum chamber into which atomized liquid fuel is drawn and converted to gaseous fuel and a compression chamber which compresses the gaseous fuel and discharges it through outlet ports 130. It will be understood that even in the compression chamber, the pressure will be very low, even below atmospheric pressure. It is only important that it be above the engine manifold pressure to induce flow of the gaseous fuel from the compression chamber to the manifold. Thus, as the rolling piston 112 rolls from the position shown in FIG. 6 to the position shown in FIG. 7, it will temporarily close port 128 and begin compressing the gaseous fuel which is ahead of the piston. When the piston reaches the position of FIG. 7, port 128 will again be open and fuel will enter into the space between piston 112 and vane 114. As the piston 112 continues to roll from the position shown in FIG. 7 to the position shown in FIG. 8, the gaseous fuel ahead of the piston will be compressed and additional fuel will be drawn into the pump by the vacuum created behind piston 112. On the other hand, the fuel ahead of piston 112 continues to be compressed and to flow through port 130 as the piston rolls from the position shown in FIG. 8 to that shown in FIG. 9. The fuel pressure will increase because of the restriction of port 130 and can vary from subatmospheric pressure to a pressure of about two atmospheres. The gaseous fuel then is drawn to the intake manifold 54 of the engine through fuel line 56 by the manifold vacuum.

Advantageously, as best seen in FIG. 2, an optional air inlet 136 provides air through passageway 138 to the end of fuel passageway 126 so that a mixture of air and fuel are drawn through ports 128 into the respective chambers 106 and 108. The amount of air which is mixed with the fuel is minute compared to the amount of liquid fuel injected through inlet ports 22 and is controlled, as by a needle valve 140, at inlet 136. This minute amount of air causes greater initial air flow when the engine is started and better fuel flow during operation in some circumstances. The amount of air, if admitted, is minimized so that it has very little effect on the vacuum in the vacuum pump. In this regard, the vacuum pump draws a very high vacuum, such as on the order of 22 to 25 inches of mercury on alcohol fuel, and 25 to 27 inches of mercury on gasoline fuel at sea level, so that the atomized fuel droplets are rapidly and completely converted from liquid to gas as they are injected through inlets 22. The optimum vacuum to obtain substantially complete vaporization of the fuel has found to be 24 inches of mercury for alcohol and 26 inches of mercury for gasoline. These high vacuums can be drawn because the system is nearly a closed system, i.e., very little air is drawn into the vacuum chamber. This permits the use of a vacuum pump of practical size and power requirements not heretofor possible.

As will be apparent from looking at FIGS. 2, 4 and 5, the liquid coolant from the engine after entering inlet 80 will pass all around the outside of cylinder 102 and will be contained by the water jacket 82. This will assure that the gaseous fuel is maintained at a relatively high temperature, both during conversion from liquid to gas in the vacuum chamber and as the gas is being compressed in the pressure chamber within each cylinder. This minimizes the possibility that any of the fuel will recondense so as not to be burned. Conveniently, the length of fuel line 56 is relatively short so that little or no condensation will take place between the vacuum pump P and the engine manifold 54. In fact, in an actual installation the vacuum pump may be located immediately adjacent the manifold so that the length of fuel line 56 is very short. It has been found that the temperature of the gaseous fuel should be kept in the range of 160° F. to 200° F., with a temperature of about 180° F. being desirable. Since this is the normal operating temperature range of most internal combustion engines, the use of the liquid coolant from the engine serves as a very practical heat exchange medium. Of course, heat could be provided from other sources, such as an electrical resistance heater, frictionally generated heat or the exhaust system of the vehicle.

From the foregoing, the advantages of this invention are readily apparent. A device for converting liquid hydrocarbon fuel to a substantially gaseous fuel has been provided wherein fuel is injected directly into a vacuum pump. The vacuum pump has an optional air bleed valve for selectively introducing a minute, controlled amount of air to the vacuum chamber to enhance flow and vaporization of the fuel. The standard carburetor for an internal combustion engine is unnecessary since vaporized fuel can immediately be introduced directly into the manifold of the internal combustion engine to be ignited by the spark plugs and start the engine upon activation of the starter motor for the engine.

The invention has been described in detail with particular reference to a preferred embodiment thereof, but it will be understood that variations and modifications can be effected within the spirit and scope of this invention.

I claim:

1. A device for converting liquid hydrocarbon fuel supplied from a supply tank to a substantially gaseous fuel which is furnished to the intake manifold of an internal combustion engine, said device comprising:
   a vacuum pump having a vacuum chamber with a single inlet and a single outlet;
   a fuel injector connected to said inlet for injecting atomized liquid fuel droplets into said vacuum chamber in timed sequence;
   means for drawing a vacuum in said vacuum chamber in timed sequence with the injection of liquid fuel droplets to provide a vacuum in said chamber at the time of injection to immediately vaporize substantially all of the liquid fuel droplets to form a gaseous fuel for increasing the pressure of the gaseous fuel for discharge through said outlet; and
   heating means in said pump for providing heat to said vacuum chamber.

2. A device, as claimed in claim 1, further including:
   an air bleed valve connected to said vacuum chamber adjacent said inlet for supplying a minute, controlled amount of air to said vacuum chamber.

3. A device for converting liquid hydrocarbon fuel supplied from a fuel tank to a substantially gaseous fuel which is furnished to the intake manifold of an internal combustion engine, said device comprising:
   a cylindrical fluid chamber having substantially flat end walls and a cylindrical side wall with a longitudinal central axis;
   a liquid fuel inlet in said fluid chamber;
   a gaseous fuel outlet in said fluid chamber;
   a movable vane, having a contacting edge, parallel to said axis for movement toward and away from said axis;
   an eccentrically mounted rolling piston mounted for rotation about said axis and within said chamber and having a length substantially equal to the length of said chamber and a diameter wherein the peripheral surface of said piston makes continuous line contact with said cylindrical side wall as said piston rotates within said chamber;

means biasing said vanes so that said vane divides said chamber into a vacuum section in communication with said inlet and a pressure section in communication with said outlet, said sections being variable in capacity as said piston rotates about said axis to create a vacuum in said vacuum section behind said piston as it rolls away from said inlet to vaporize the liquid fuel and to compress gaseous fuel in said pressure section ahead of said piston as it rolls toward said outlet;

a fuel injector connected to said inlet for injecting liquid fuel droplets into said chamber only during said vacuum cycle to evaporate the liquid fuel droplets into gaseous fuel; and time means for synchronizing the injection of liquid fuel droplets into said chamber with said vacuum cycle.

4. A device, as claimed in claim 3, further including: an air bleed valve connected to said vacuum chamber adjacent said inlet for supplying a minute, controlled amount of air to said vacuum chamber.

5. A device as claimed in claim 3, further including: a heater for said chamber for maintaining said gaseous fuel at substantially constant temperature to minimize recondensation during the compression cycle.

6. A device, as claimed in claim 5, wherein said heater comprises a heat exchanger which includes:
a housing substantially surrounding said fluid chamber and having an inlet and an outlet; and
means connected to said inlet and outlet of said housing for circulating a heated fluid in heat exchange relationship past said fluid chamber.

7. A device as claimed in claim 3, further including: means supplying a lubricant along the surface of sand vane ot the edge thereof for lubricating the surface of said piston and provide a fluid seal between said vane edge and said piston surface and between said piston surface and said cylindrical wall along said line contact.

8. A device, as claimed in claim 3, wherein said timing means includes:
an air-mass sensor which continuously measures and controls the weight of air entering the engine to mix with the gaseous fuel supplied from said outlet.

* * * * *